United States Patent
Ding et al.

(10) Patent No.: US 9,330,224 B2
(45) Date of Patent: May 3, 2016

(54) METHOD AND APPARATUS FOR DUMMY CELL PLACEMENT MANAGEMENT

(71) Applicant: Oracle International Corporation, Redwood City, CA (US)

(72) Inventors: Duo Ding, Austin, TX (US); Srinivas Sanivarapu, Cedar Park, TX (US); Lai-ching Lydia So, Cupertino, CA (US); Joseph Curt Peters, Austin, TX (US); Carl Alfred Shisler, Austin, TX (US); Gary Lynn Fowler, Leander, TX (US); Thuvan Le, San Jose, CA (US); Kaiwha Peng, Santa Clara, CA (US); Tao Hou, Santa Clara, CA (US); Wilson Fai Chin, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 73 days.

(21) Appl. No.: 14/266,708

(22) Filed: Apr. 30, 2014

(65) Prior Publication Data

US 2015/0317425 A1 Nov. 5, 2015

(51) Int. Cl.
*G06F 17/50* (2006.01)

(52) U.S. Cl.
CPC ........ *G06F 17/5081* (2013.01); *G06F 17/5072* (2013.01); *G06F 17/5077* (2013.01); *G06F 2217/12* (2013.01)

(58) Field of Classification Search
CPC ............ G06F 17/5072; G06F 17/5077; G06F 17/5081; G06F 2217/12
USPC .............. 716/112, 54, 55, 122, 123, 129, 130
See application file for complete search history.

(56) References Cited

U.S. PATENT DOCUMENTS

| | | | | |
|---|---|---|---|---|
| 5,885,856 A * | 3/1999 | Gilbert | ............. | H01L 21/31053 257/E21.244 |
| 5,970,238 A * | 10/1999 | Shibata | ............... | G06F 17/5077 257/E23.151 |
| 6,081,272 A * | 6/2000 | Morimoto | ........... | G06F 17/5068 257/E21.244 |
| 6,327,695 B1 * | 12/2001 | Bothra | ............. | H01L 21/76224 257/E21.546 |
| 7,107,573 B2 * | 9/2006 | Yamazoe | ................ | G03F 1/144 430/311 |
| 7,712,070 B2 * | 5/2010 | Moon | ................... | H01L 27/105 430/30 |
| 7,763,398 B2 * | 7/2010 | Lee | ......................... | G03F 1/144 430/5 |
| 8,028,264 B2 * | 9/2011 | Shimada | ............. | H01L 27/0203 716/118 |
| 8,458,627 B2 * | 6/2013 | Taoka | ..................... | E21B 43/24 257/202 |
| 9,111,065 B2 * | 8/2015 | Liu | ..................... | G06F 17/5072 |
| 9,147,029 B2 * | 9/2015 | Ke | ...................... | G06F 17/5072 |
| 2002/0063335 A1 * | 5/2002 | Ozawa | ............... | G06F 17/5077 257/758 |
| 2004/0025125 A1 * | 2/2004 | Li | ....................... | G06F 17/5068 716/112 |
| 2005/0023656 A1 * | 2/2005 | Leedy | ...................... | B81B 7/02 257/678 |

(Continued)

*Primary Examiner* — Phallaka Kik
(74) *Attorney, Agent, or Firm* — Osha Liang LLP

(57) ABSTRACT

A method for manipulating a circuit design includes receiving multiple dummy cell modification parameters, selecting, by a computer processor and based on the dummy cell modification parameters, a dummy cell insertion region on a circuit design, and generating, in the dummy cell insertion region, multiple dummy cells. The method further includes selecting a first dummy cell from the dummy cells, determining, by the computer processor and based on a location of the first dummy cell, an illegal overlap with the first dummy cell, and removing, by the computer processor and from the dummy cells, the first dummy cell. The method further includes inserting, by the computer processor, on the circuit design, and after removing the first dummy cell, the dummy cells to obtain a modified circuit design, and presenting the modified circuit design.

20 Claims, 10 Drawing Sheets

(56) References Cited

U.S. PATENT DOCUMENTS

| | | | |
|---|---|---|---|
| 2005/0080607 A1* | 4/2005 | Lakshmanan | G06F 17/5068 703/14 |
| 2006/0080643 A1* | 4/2006 | Ogawa | G06F 8/423 717/126 |
| 2006/0166434 A1* | 7/2006 | Kinoshita | G06F 17/5068 438/253 |
| 2006/0190920 A1* | 8/2006 | Sakurai | G03F 1/144 716/53 |
| 2006/0236282 A1* | 10/2006 | Eshima | G06F 17/5068 716/113 |
| 2006/0259888 A1* | 11/2006 | McClellan | H01L 22/20 716/112 |
| 2007/0004147 A1* | 1/2007 | Toubou | G06F 17/5072 438/261 |
| 2007/0027567 A1* | 2/2007 | Lin | G03F 7/70433 700/121 |
| 2008/0045000 A1* | 2/2008 | Mori | H01L 23/528 438/622 |
| 2008/0120586 A1* | 5/2008 | Hoerold | G06F 17/5081 716/52 |
| 2008/0121939 A1* | 5/2008 | Murray | G03F 1/144 257/202 |
| 2008/0203562 A1* | 8/2008 | Araki | H01L 23/5286 257/734 |
| 2008/0235643 A1* | 9/2008 | Taravade | H01L 21/7684 716/119 |
| 2008/0282218 A1* | 11/2008 | Lee | G03F 1/144 716/55 |
| 2008/0315365 A1* | 12/2008 | Takada | H01L 21/3212 257/618 |
| 2009/0007041 A1* | 1/2009 | Miyagawa | G06F 17/5031 716/113 |
| 2009/0032899 A1* | 2/2009 | Irie | G06F 17/5059 257/499 |
| 2009/0049420 A1* | 2/2009 | Kobayashi | G06F 17/5068 716/53 |
| 2009/0055792 A1* | 2/2009 | Itagaki | G06F 17/5068 716/129 |
| 2009/0055794 A1* | 2/2009 | Kimoto | G06F 17/5068 716/55 |
| 2009/0064078 A1* | 3/2009 | Kimura | G06F 17/5077 716/119 |
| 2009/0113373 A1* | 4/2009 | Fukuda | G06F 17/5081 716/129 |
| 2009/0181314 A1* | 7/2009 | Shyu | G03F 1/144 430/5 |
| 2009/0276745 A1* | 11/2009 | Nitta | G06F 17/5031 716/113 |
| 2010/0242008 A1* | 9/2010 | Liu | G06F 17/5072 716/108 |
| 2010/0306727 A1* | 12/2010 | Itagaki | G06F 17/5068 716/122 |
| 2011/0016443 A1* | 1/2011 | Fu | G06F 17/5068 716/108 |
| 2012/0144361 A1* | 6/2012 | Cheng | G06F 17/5068 716/132 |
| 2012/0180018 A1* | 7/2012 | Chen | H01L 23/522 716/130 |
| 2012/0273899 A1* | 11/2012 | Wann | G06F 17/5068 257/401 |
| 2012/0278776 A1* | 11/2012 | Lei | H01L 27/0207 716/111 |
| 2012/0278777 A1* | 11/2012 | Lin | G06F 17/5068 716/111 |
| 2012/0278781 A1* | 11/2012 | Wann | G06F 17/5068 716/122 |
| 2012/0295187 A1* | 11/2012 | Tsai | G06F 17/5072 430/5 |
| 2013/0227502 A1* | 8/2013 | Fang | G06F 17/5068 716/102 |
| 2013/0232461 A1* | 9/2013 | Fukuda | G06F 17/5077 716/130 |
| 2014/0258961 A1* | 9/2014 | Ke | G06F 17/5072 716/122 |
| 2014/0282345 A1* | 9/2014 | Yuan | G06F 17/5077 716/126 |
| 2014/0325466 A1* | 10/2014 | Ke | G06F 17/5072 716/119 |

* cited by examiner

METHOD AND APPARATUS FOR DUMMY CELL PLACEMENT MANAGEMENT

BACKGROUND

In general, circuit designers pursue a circuit design that minimizes device degradation during manufacturing of a semiconductor wafer. One way to minimize device degradation is through the use of dummy cells. A dummy cell is a transistor that is turned off. Specifically, circuit designers may insert, delete, or move dummy cells in a circuit design to minimize the potential for defects during manufacturing.

SUMMARY

In general, in one aspect, embodiments relate to a method for manipulating a circuit design including receiving multiple dummy cell modification parameters, selecting, by a computer processor and based on the dummy cell modification parameters, a dummy cell insertion region on a circuit design, and generating, in the dummy cell insertion region, multiple dummy cells. The method further includes selecting a first dummy cell from the dummy cells, determining, by the computer processor and based on a location of the first dummy cell, an illegal overlap with the first dummy cell, and removing, by the computer processor and from the dummy cells, the first dummy cell. The method further includes inserting, by the computer processor, on the circuit design, and after removing the first dummy cell, the dummy cells to obtain a modified circuit design, and presenting the modified circuit design.

In general, in one aspect, embodiments relate to a system for manipulating a circuit design including a data repository for storing the circuit design, a computer processor, a dummy cell manager, and a graphical user interface. The dummy cell manager executes on the computer processor and is for causing the computer processor to select, based on multiple dummy cell modification parameters, a dummy cell insertion region on a circuit design, generate, in the dummy cell insertion region, multiple dummy cells, select a first dummy cell from the dummy cells, determine, based on a location of the first dummy cell, an illegal overlap with the first dummy cell, remove, from the dummy cells, the first dummy cell, and insert, on the circuit design and after removing the first dummy cell, the dummy cells to obtain a modified circuit design. The graphical user interface executes on the computer processor and is for causing the computer processor to receive the dummy cell modification parameters, and present the modified circuit design.

In general, in one aspect, embodiments relate to a non-transitory computer readable medium storing instructions for manipulating a circuit design. The instructions include functionality to receive multiple dummy cell modification parameters, select, based on the dummy cell modification parameters, a dummy cell insertion region on a circuit design, and generate, in the dummy cell insertion region, multiple dummy cells. The instructions further include functionality to select a first dummy cell from the dummy cells, determine, based on a location of the first dummy cell, an illegal overlap with the first dummy cell, remove, from the dummy cells, the first dummy cell, insert, on the circuit design and after removing the first dummy cell, the dummy cells to obtain a modified circuit design, and present the modified circuit design.

Other aspects of the invention will be apparent from the following description and the appended claims.

DETAILED DESCRIPTION

Figure 1:
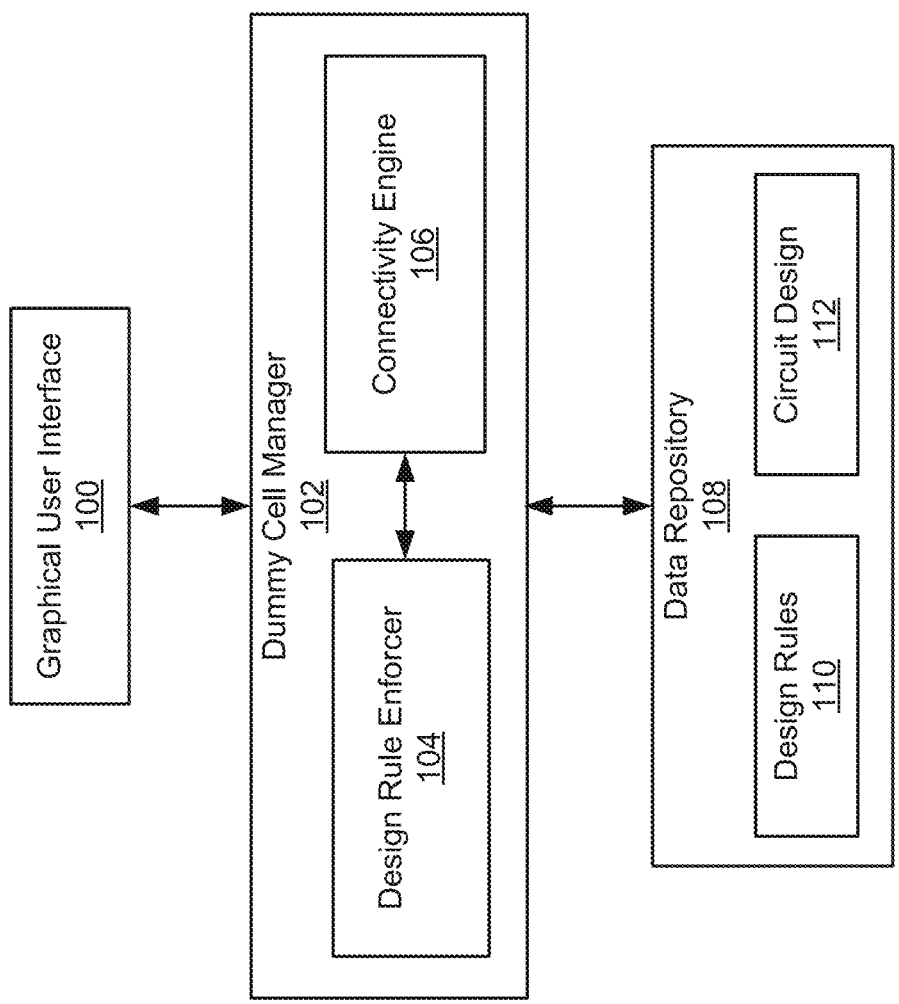
FIG. 1 shows a schematic design of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for manipulating a circuit design. Specifically, embodiments of the invention insert, delete, or modify dummy cells in a circuit design. Upon insertion of dummy cells, a dummy cell manager enforces design rules to ensure the legal insertion of dummy cells. Further, connections between dummy cells and surrounding circuit elements are added. Similarly, embodiments of the invention may delete dummy cells along with any corresponding connections.

FIG. 1 shows a schematic design of a dummy cell management system in accordance with one or more embodiments of the invention. In general, the dummy cell management system controls the insertion, deletion, and modification of dummy cells in the circuit design.

In one or more embodiments of the invention, the data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site. The data repository stores a circuit design (112) and design rules (110). Each type of data is described below.

In one or more embodiments of the invention, a circuit design (112) is a representation of devices and the connections between devices that is used to manufacture semiconductor wafers.

In one or more embodiments of the invention, a semiconductor wafer is a wafer made of semiconductor material. The semiconductor wafer may include a well area, an oxide diffusion area, and a poly silicon area. Based on the manufacturing of the semiconductor wafer, each area may be created through the application of layers of oxide, semiconductor, and poly-silicon materials. In one or more embodiments of the invention, a semiconductor wafer includes devices and connections between devices. In other words, the semiconductor wafer may also act as a substrate for devices. A device is any semiconductor component that may affect electrons or the fields associated with electrons. The device may also be referred to as a microelectric device. For example, a device may be a transistor, diode, capacitor, inductor, resistor, insulator, conductor, etc. A connection is a wire that connects the terminals of two or more devices.

In one or more embodiments of the invention, a circuit design (112) is represented using a hierarchy model. Specifically, the circuit design (112) may be partitioned into multiple hierarchies. A hierarchy represents a region of a circuit design (112) that includes at least one device. In one or more embodiments of the invention, the region covered by a hierarchy is the region occupied by a group of particular devices that perform a function. For example, if a group of devices function to receive input data, then the region occupied by the group of devices may be in the same hierarchy.

In one or more embodiments of the invention, each hierarchy may include one or more levels. A level represents a sub-region of the region in a given hierarchy. In one or more embodiments of the invention, each level includes at most one device. Further, levels may also include additional levels. For example, if Level A denotes half of the region covered by a hierarchy, Level B may denote half of the region covered by Level A. Thus, Level B is within Level A.

In one or more embodiments of the invention, a hierarchy and corresponding set of levels may be represented using a tree design with the level nodes as child nodes to a parent node. Further, level nodes may be child nodes to a previous level node. The child-parent relationship is based on the regions covered by each level in relation to other levels and/or the hierarchy. In the case of a hierarchical design mapped to a tree hierarchies with nodes, each node represents a basic part the entire design. The basic part is an instance or an instantiated template cell from a common library. The parent-child relationship is defined based on the functionalities of a parent instance being designed through combining the child instance functionalities. In other words, the parent node represents an instance that has various functionalities which is created through combining the functionalities of the instances represented by the child nodes of the parent node. Further, a tree design may include multiple hierarchies that are parallel to one another. For example, if Level A covers one-fourth of a hierarchy, then Level A may be a child node to the hierarchy parent node. Further, if Level B covers one-third of Level A, then Level B may be a child node to the Level A node.

In one or more embodiments of the invention, the circuit design (112) has a schematic and a layout for representing the circuit. Each type of circuit representation is described below.

In one or more embodiments of the invention, a schematic of the circuit design (112) is a logical representation of the circuit design using symbols and lines. Specifically, the schematic represents the devices using symbols and represents connections using lines. For example, a circuit design with a transistor connected to a power signal may be represented using a symbol for a transistor and a symbol for a power source. The wire between the transistor and power source is represented as a line between the two symbols.

In one or more embodiments of the invention, the layout of the circuit design (112) is a representation of the physical placement of devices and connections. Specifically, the layout represents the devices and the connections using symbols and connections in physical space as placed on a semiconductor wafer. In one or more embodiments of the invention, the layout represents the spacing between devices and connections that are to scale with the physical arrangement on the semiconductor wafer. In one or more embodiments of the invention, the layout includes representations of the layers of metal, oxide, and semiconductor material that are used to fabricate the devices in the semiconductor wafer.

For example, a circuit design that includes 20 transistors may be represented on a circuit board with symbols showing the spacing between transistors and the thickness of each transistor. The spacing is scaled to the size of the transistors in relation to the connections. In the example, the materials that are used to create the n-doped areas of the transistors may also be represented through a color coding scheme.

Returning to FIG. 1, the data repository (108) also includes design rules (110) in accordance with one or more embodiments of the invention. A design rule is a rule that specifies a physical limitation on particular device. In one or more embodiments of the invention, a design rule may also specify a physical limitation of a group of devices. The physical limitations may include spacing, voltage constraints, and device matching requirements. For example, a design rule may specify that a particular device requires spacing of at least ten microns on all sides. A design rule may be specified by a manufacturer of the device, a user, based on third party analysis of a limitation of the device, or another entity.

Referring to FIG. 1, the data repository (108) is connected to a dummy cell manager (102). The dummy cell manager (102) controls the insertion, deletion, and modification of dummy cells using a design rule enforcer (104) that is connected to a connectivity engine (106). Each component is described below.

In one or more embodiments of the invention, a dummy cell is a transistor that is turned off. A transistor is a device with at least 3 terminals and at least 3 zones: diffusion zone, channel zone, and gate zone. In one or more embodiments of the invention, a transistor is turned off when no current exists in every terminal of a transistor. For example, all three terminals of a transistor may be connected to a ground signal. Thus, with all terminals connected to ground, no current exists in the terminals of the transistor and the transistor is functionally off.

In one or more embodiments of the invention, a transistor includes attributes. An attribute is a property of a transistor that may be configured. The attributes include type of transistor, depth, width, and type of transistor substrate. The transistor type includes n-channel metal-oxide-semiconductor field-effect transistor (nMOSFET), p-channel metal-oxide-semiconductor field-effect transistor (pMOSFET), and bipolar transistors. In one or more embodiments of the invention, a dummy cell may be connected to surrounding devices. Further, a dummy cell may include identical or similar attributes as a nearby device.

In one or more embodiments of the invention, each dummy cell is assigned a dummy cell identifier. The dummy cell identifier is a unique identifier that is used by the dummy cell management system to distinguish dummy cells from each other. In other words, the dummy cell identifier is unique amongst the dummy cells located on the same semiconductor wafer. The dummy cell identifier may include a string of numbers, letters, symbols, or any combination thereof. In some embodiments, the dummy cell identifier may be assigned randomly by the dummy cell management system. Alternatively, dummy cells may be assigned consecutive identifiers or assigned identifiers according to a formula.

In one or more embodiments of the invention, a group of dummy cells may be physically organized as a stack to create a dummy cell stack. The group of dummy cells in the dummy cell stack includes the same attributes in accordance with one or more embodiments of the invention. For example, a dummy cell stack may include four n-type dummy cells stacked on top of one another.

As shown in FIG. 1, the dummy cell manager (102) includes a design rule enforcer (104). The design rule enforcer (104) uses design rules (110) to place, remove, and move dummy cells in the circuit design (112). Further, the design rule enforcer (104) includes functionality to configure the attributes of dummy cells. In one or more embodiments of the invention, the dummy cell manager (102) includes functionality to generate and select legal dummy cells. A legal dummy cell is a dummy cell that satisfies all design rules specified by the user and manufacturer. For example, the design rule manager may determine that a dummy cell may not be placed in a particular location due to a spacing design rule of a nearby device.

Referring to FIG. 1, the connectivity engine (106) is connected to the design rule enforcer (104). The connectivity engine (106) adds, deletes, and modifies connections between devices. Further, the connectivity engine includes functionality to create, delete, and combine the symbols used to represent devices. For example, if a dummy cell is inserted, the connectivity engine may add connections between the dummy cell and other devices. In the example, a dummy cell is inserted onto a preexisting a stack of five dummy cells. Following the example, the connectivity engine includes functionality to combine the symbols for the inserted dummy cell with the preexisting dummy cell stack to create a stack with six dummy cells.

As shown in to FIG. 1, the dummy cell manager (102) is connected to a graphical user interface (GUI) (100). The GUI (100) is a type of user interface for the dummy cell manager (102). The GUI (100) presents both information to users and the functions of the dummy cell management system available to users, including functions to modify the circuit design (112), through graphical elements. Users may interact with the GUI (100), at least in part, through direct manipulation of the graphical elements (e.g., pushing buttons, selecting menu items, selecting radio buttons, clicking icons, checking boxes, etc.).

In one or more embodiments of the invention, the GUI also includes functionality to display the schematic and layout representations of a circuit design. The GUI may represent the circuit design according to hierarchies in accordance with one or more embodiments of the invention. Further, the GUI may include functionality to propagate the user's interactions with one representation to another representation. For example, if the user modifies a dummy cell in the layout, the change is propagated to the schematic without user interaction.

In one or more embodiments of the invention, through the user's interactions with the GUI (100), dummy cell modification parameters are collected. A dummy cell modification parameter is a parameter describing at least one dummy cell operation to perform on a dummy cell. A dummy cell operation is an operation that may be performed on a dummy cell. For example, the dummy cell operation includes insertion, deletion, and modification of a dummy cell. Further, dummy cell modification parameters include the attributes of the dummy cells to be modified or created. In one or more embodiments of the invention, the dummy cell modification parameters may also specify a particular region of the circuit design to perform a dummy cell operation on. Similarly, the dummy cell modification parameters may include the connections to add for a given dummy cell or dummy cell stack.

For example, a user specifies, via a GUI, to insert a stack of five p-type dummy cells that are all connected to ground. Accordingly, the dummy cell modification parameters include a dummy cell operation to insert a stack of five p-type dummy cells into the circuit design. Further, the dummy cell modification parameters include an operation to connect the all terminals of the dummy cells in the dummy cell stack to the ground signal.

While FIG. 1 shows a configuration of components, other configurations may be used without departing from the scope of the invention. For example, various components may be combined to create a single component. As another example, the functionality performed by a single component may be performed by two or more components.

Figure 2:
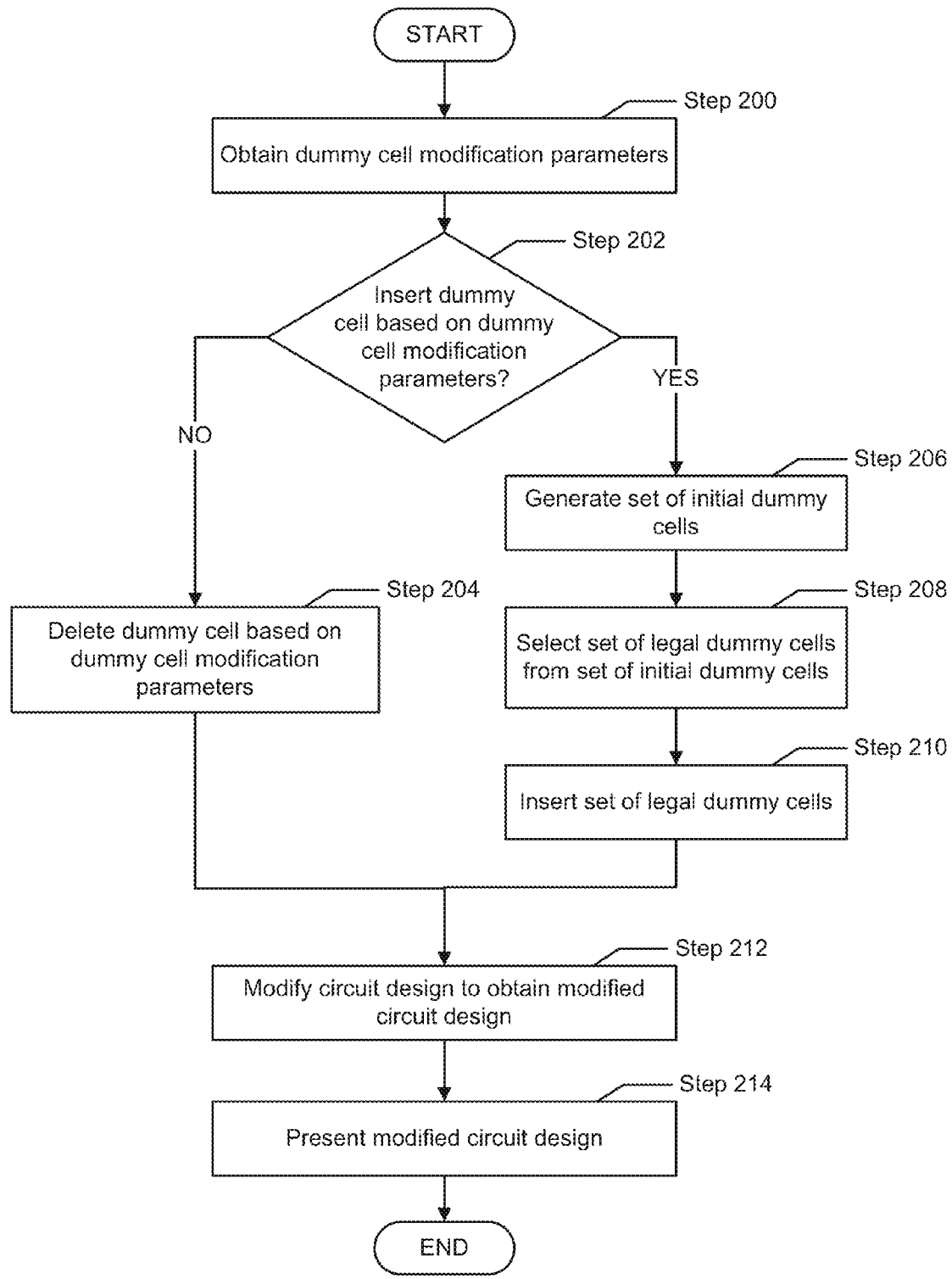
FIGS. 2, 3, and 4 show flowcharts in accordance with one or more embodiments of the invention.
Figure 3:
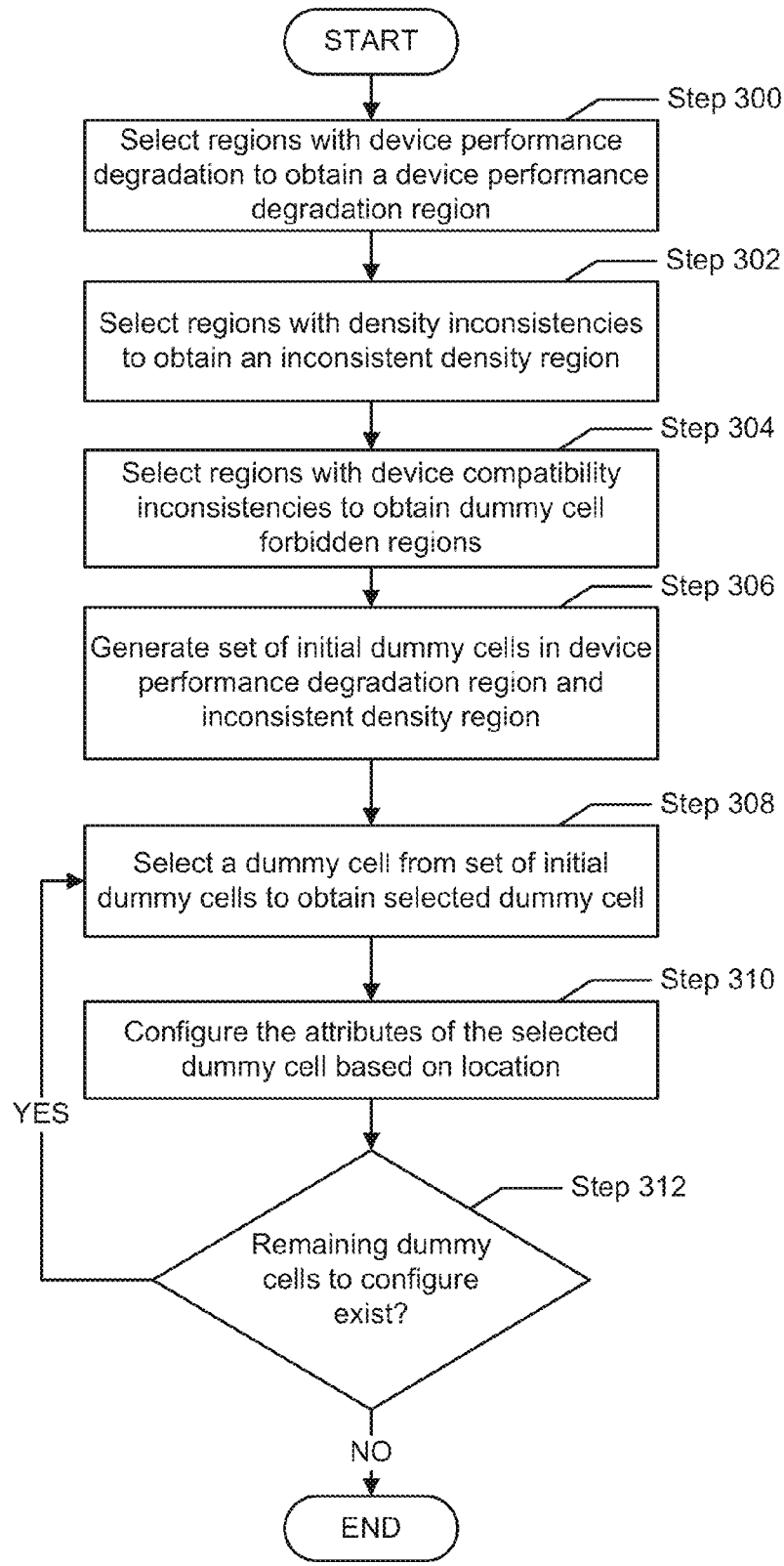
Figure 4:
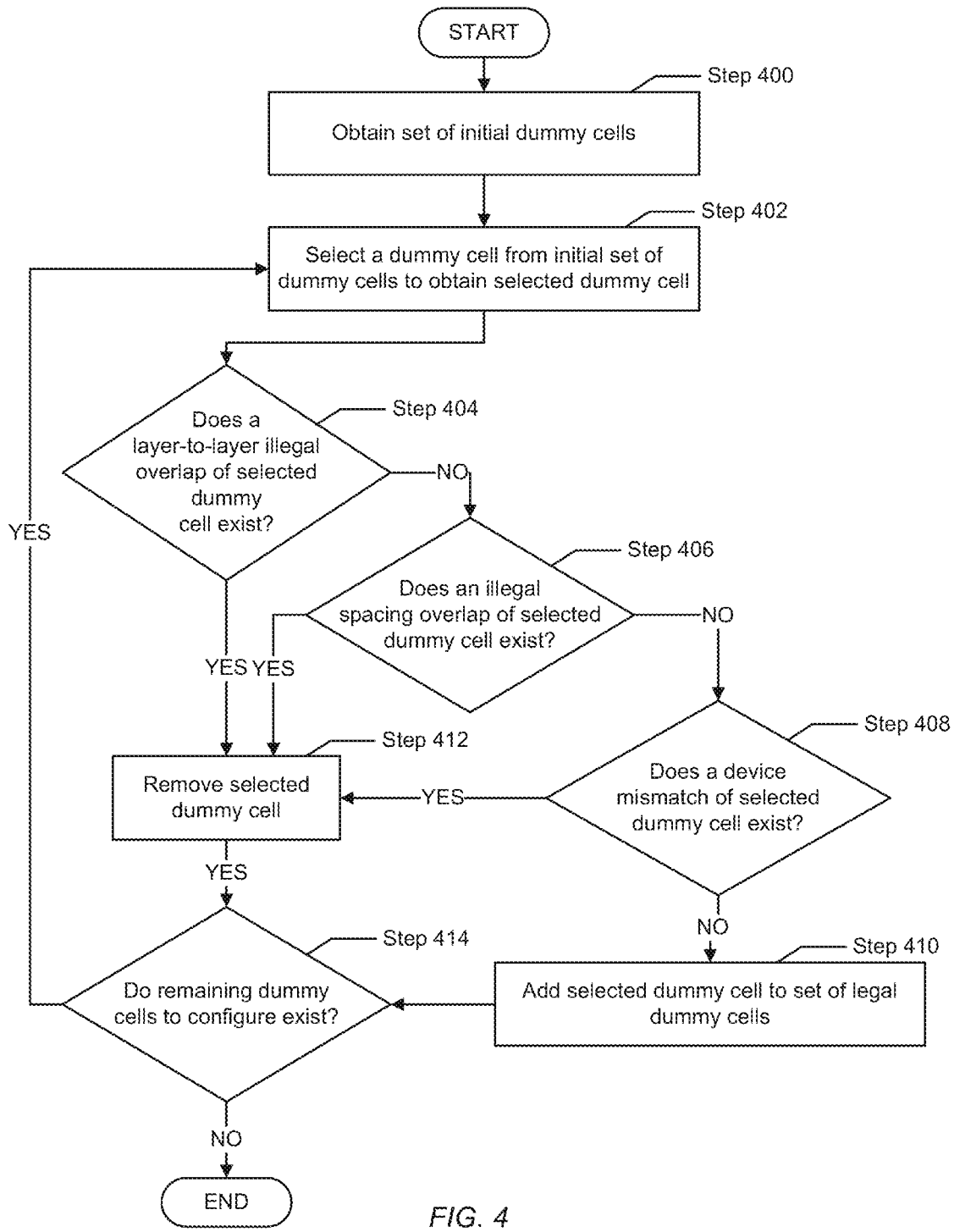

FIGS. 2, 3, and 4 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for managing the insertion and deletion of a dummy cell in accordance with one or more embodiments of the invention. In Step 200, dummy cell modification parameters are obtained in accordance with one or more embodiments of the invention. Specifically, the dummy cell modification parameters are obtained from the user's interaction with the GUI. In one or more embodiments of the invention, the user may interact with graphical elements on the GUI to determine the dummy cell modification parameters. For example, the user may select dummy cell modification parameters on a GUI similar to the GUI shown in FIG. 5C. In the example, the user may select to insert a dummy cell in a particular region of the circuit design.

In one or more embodiments of the invention, the dummy cell modification parameters may be stored and pre-populated from a previous use of an operation. When modifying multiple circuit designs with identical operations, the user may select to use a previous set of dummy modification parameters, minimizing the time spent specifying operations to perform. For example, if a user has frequently selected inserting a stack of 5 p-type dummy cells, the GUI may be pre-populated with the dummy cell modification parameters submitted previously by the user.

In Step 202, a determination is made whether a dummy cell is to be inserted based on the dummy cell modification parameters in accordance with one or more embodiments of the invention. Specifically, the determination is based on the dummy cell operation selected by the user in the dummy cell modification parameters. A dummy cell modification parameter that includes an operation to insert a dummy cell signifies that a dummy cell is to be inserted. Accordingly, if a dummy cell is to be inserted, then the process proceeds to Step 206. Otherwise, the process proceeds to Step 204.

In Step 204, the dummy cell is deleted based on the dummy cell modification parameters in accordance with one or more embodiments of the invention. Specifically, the dummy cell is identified in the circuit design and then deleted. In one or more embodiments of the invention, the dummy cell symbol is removed from the schematic and layout. Further, the GUI representation of the schematic and layout may reflect the removal of the dummy cell from the circuit design. For example, if a dummy cell is deleted, then the GUI representation layout and schematic may show the remaining circuit with a blank space at the location of the deleted dummy cell.

In one or more embodiments of the invention, the connections associated with the dummy cell are also deleted. Specifically, the connections to the terminals of the dummy cell are removed in the circuit design. The connection is removed from both the terminal of the dummy cell and the terminal on the other end of the connection. If the connection is between the dummy cell and at least two other devices, the connection may be removed from all terminals in the connection. In one or more embodiments of the invention, the connections that may not be deleted are identified. By deleting connections previously connected to the deleted dummy cell, the likelihood of loose connections in the circuit design is reduced. Thus, the circuit design is less likely to exhibit unpredictable behavior.

For example, if a shared connection exists between the terminals of Dummy Cell A, Dummy Cell B, and Dummy Cell C, and Dummy Cell A is deleted, then the connection between Dummy Cell A and Dummy Cell B as well as the connection between Dummy Cell A and Dummy C are deleted. Thus, the connection between Dummy Cell B and Dummy Cell C is left intact. Because the dummy cells are created using a 'connection by abutment' method, no routes or other connections to be deleted exist in accordance with one or more embodiments of the invention. However, dummy cell removals may be followed by design updates, which is layout and context driven and may be monitored by the design rule enforcer. The modifications may be related to Poly and Oxide Diffusion design rules with respect to the remaining cells after the deletion. For example, if upon removal of certain dummy cell(s), the adjacent transistor to the certain dummy cell is now on the edge of an oxide diffusion area, then the adjacent transistor's oxide diffusion area may need to be further extended and one or more dummy poly tracks may need to be added according to certain specifications. One or more embodiments of the invention extend the oxide diffusion area add the dummy poly tracks.

Returning to Step 202, if a determination is made to insert a dummy cell, a set of initial dummy cells is generated in Step 206 in accordance with one or more embodiments of the invention. Specifically, the set of initial dummy cells is generated as shown in FIG. 3.

In Step 208, a set of legal dummy cells is selected from the set of initial dummy cells in accordance with one or more embodiments of the invention. Specifically, the set of legal dummy cells is generated as shown in FIG. 4.

In Step 210, the set of legal dummy cells is inserted in accordance with one or more embodiments of the invention. Specifically, the locations to insert the dummy cells are identified and the dummy cells are inserted. In one or more embodiments of the invention, a stack of dummy cells may be inserted into the circuit design. Alternatively, each dummy cell in a dummy cell stack may be placed individually. With the application of design rules specified by the user and the manufacturer, multiple dummy cells may be placed at one time instead of each dummy cell being placed one at a time.

In one or more embodiments of the invention, during dummy cell insertion, the layout and schematic are updated to include dummy cells in the circuit design. Specifically, the dummy cell symbol is created and added into the schematic and layout. Further, the GUI representation of the schematic and layout may reflect the addition of the dummy cell in the circuit design. For example, if a dummy cell is added, then the GUI representation layout and schematic may show the previous circuit design with additional symbols at the location of the inserted dummy cell.

In one or more embodiments of the invention, the connections associated with the dummy cell are also inserted. Specifically, the connections to the terminals of the dummy cell to surrounding devices are created. The dummy cell may be connected to one or more devices. In one or more embodiments of the invention, the connection between a dummy cell terminal and a specified signal, as determined by the dummy cell modification parameters, may be created. The specified signal may be the signal running through a net shared by a part of the circuit, a ground signal, or other related signal. For example, the dummy cell modification parameters may specify that a dummy cell is to be connected to ground.

In Step 212, the circuit design is modified to obtain a modified circuit design in accordance with one or more embodiments of the invention. Specifically, the symbols representing devices and connections between the devices are updated based on the deletion or insertion of dummy cells.

In one or more embodiments of the invention, the symbols and lines representing devices and connections, respectively, are updated to consolidate preexisting symbols with added symbols. Specifically, dummy cells may be consolidated with preexisting dummy cells to form a dummy cell stack. By compacting symbols as presented on the GUI, performing operations such as deleting a stack of dummy cells is more convenient for the user. For example, if a dummy cell is placed on a dummy cell stack that includes 4 dummy cells, the symbols may be updated to create a dummy cell stack of 5 dummy cells.

In one or more embodiments of the invention, preexisting symbols representing devices are updated to account for a deleted dummy cell. Specifically, a preexisting symbol is divided based on a deleted dummy cell. In other words, with the division of symbols, the circuit design is devoid of unwanted gaps in dummy cell structures. For example, if a dummy cell in the middle of a dummy cell stack including 6 dummy cells is deleted, the symbols may be updated to create two dummy cell stacks: one dummy cell stack of 3 dummy cells and another dummy cell stack of 2 dummy cells.

In Step 214, the modified circuit design is presented in accordance with one or more embodiments of the invention. Specifically, the modified circuit design from Step 212 is displayed to the user via the GUI. In one or more embodiments of the invention, the user may also be presented with options to continue inserting and/or deleting dummy cells.

FIG. 3 shows a flowchart for generating a set of initial dummy cells in accordance with one or more embodiments of the invention. In Step 300, regions with device performance degradation are selected in accordance with one or more embodiments of the invention. Specifically, regions with device performance degradation are identified based on the spacing between devices and regions of a semiconductor wafer. The spacing between devices and areas affect device performance as determined by layout dependent effects. Layout dependent effects are based on the spacing between devices and each of the areas on a semiconductor wafer. In one or more embodiments of the invention, the spacing required to avoid layout dependent effects may be set by the manufacturer. Layout dependent effects include the well proximity effect, oxide spacing effect, poly spacing effect, and length of diffusion effect. Each effect is described below.

In one or more embodiments of the invention, the well proximity effect results a variation in threshold voltage based on the spacing between the edge of a well and a device. Specifically, the distance from the edge of a well and a device affects the threshold voltage of a device. The shorter the distance is between the edge of a well and a device results in greater undesired variation in threshold voltage. In one or more embodiments of the invention, placing a dummy cell in the area between the device and the edge of the well region may mitigate the effects of the current leakage that occurs during the well proximity effect. For example, if the distance between a well edge and a device is less than the spacing recommended by the manufacturer, variation in threshold voltage may occur.

In one or more embodiments of the invention, the oxide spacing effect results in a variation in device performance if neighboring devices include unequal oxide diffusion area spacing. The oxide diffusion area spacing is the distance between a device and the edge of the oxide diffusion area. Neighboring devices with oxide diffusion area spacing that do not match results in a degradation of device performance. In one or more embodiments of the invention, placing a dummy cell in the area between the device and the edge of the oxide diffusion area may equalize the oxide diffusion spacing for neighboring devices. For example, if the oxide diffusion area spacing for a device does not match that of neighboring devices, the devices may experience unpredictable device performance.

In one or more embodiments of the invention, the poly spacing effect results in a variation in drain current based on neighboring devices including the unequal poly-silicon area spacing. The poly-silicon area spacing is the distance between a device and the edge of the poly-silicon area. Neighboring devices with poly-silicon area spacing that do not match results in a variation of drain current. In one or more embodiments of the invention, placing a dummy cell in the area between the device and the edge of the poly-silicon area may equalize the poly-silicon spacing for neighboring devices. For example, if the poly-silicon area spacing for a device does not match that of neighboring devices, the devices may experience unpredictable drain currents.

In one or more embodiments of the invention, the length of diffusion effect results in a change in device performance based on the spacing between the edge of the diffusion zone of a device and the gate zone of a device. Specifically, the distance from the edge of the diffusion zone and the gate zone affects the threshold voltage of a device. The greater the distance is between the edge of the diffusion zone and the gate zone results in variation in the threshold voltage of the device. In one or more embodiments of the invention, insertion of a dummy cell in the region between the diffusion zone and the gate zone may reduce or eliminate the effects of the current leakage that occurs during the length of diffusion effect. For example, if the distance between a diffusion zone and the gate zone is greater than the spacing recommended by the manufacturer, variation in threshold voltage may occur.

Through insertion of dummy cells, layout dependent effects are reduced or eliminated as the inserted dummy cells act as a buffer between devices and areas of a semiconductor wafer. Specifically, dummy cells are inserted between devices and an area of the semiconductor. For example, as mentioned above, a dummy cell that is inserted between a device and the edge of the well area may mitigate the effects of the current leakage that occurs during the well proximity effect. By way of another example, as mentioned above, a dummy cell that is inserted between the device and the edge of the oxide diffusion area may equalize the oxide diffusion spacing for neighboring devices. Thus, the oxide spacing effect is reduced. Likewise, a dummy cell that is inserted between the device and the edge of the poly-silicon area may equalize the poly-silicon spacing for neighboring devices and reduce the poly spacing effect. As another example, insertion of a dummy cell in the region between the diffusion zone and the gate zone may reduce or eliminate the effects of the current leakage that occurs during the length of diffusion effect.

In Step 302, regions with density inconsistencies are selected in accordance with one or more embodiments of the invention. A density inconsistency refers to a scenario in which at least two adjacent regions have different densities of devices in accordance with one or more embodiments of the invention. Alternatively or additionally, a density inconsistency refers to a scenario in which at least two adjacent regions have different densities of devices of the same type in accordance with one or more embodiments of the invention. Specifically, the density of devices is determined for regions and compared. In one or more embodiments of the invention, the density of a particular type of device is determined and used to compare with the densities of adjacent regions. In one or more embodiments of the invention, the calculated density may be used to determine the number of dummy cells to insert in a region. In one or more embodiments of the invention, the layout, via GUI, displays a high concentration of devices in some regions of the semiconductor wafer and a lower concentration of devices in other regions. The high concentration of devices is displayed to the user via a high number of symbols grouped in the same region. Likewise, the low concentration of devices is denoted through a display of devices sparsely arranged in a region of the semiconductor.

Through insertion of dummy cells, device density incompatibility effects are reduced or eliminated as the inserted dummy cells act to equalize the flow of current throughout the semiconductor wafer. Specifically, dummy cells are inserted into regions of the semiconductor with a lower density of devices. For example, one region may have a high density of devices in comparison to the low density of devices in an adjacent region. By way of another example, one region may have a high density of n-type transistors in comparison to the density of n-type transistors of an adjacent region.

In Step 304, regions with device compatibility inconsistencies are selected to obtain dummy cell forbidden regions in accordance with one or more embodiments of the invention. A device compatibility inconsistency refers to a scenario in which the region fails to comply with a device matching requirement in accordance with one or more embodiments of the invention. Specifically, regions with device matching requirements are selected as forbidden regions. A device matching requirement is a constraint on spacing based on a physical property of neighboring devices. A physical property includes voltage supply to a device, voltage operation thresholds, and device size. In one or more embodiments of the invention, if a neighboring device includes the specified physical property, a spacing specified by the manufacturer is required. Accordingly, the forbidden region is selected by mapping the spacing required by a device with device matching requirements. Through the creation of forbidden regions for dummy cell placement, the user avoids placing dummy cells in regions that are known to cause design rule violations. Thus, the forbidden regions reduce the possibility of design rule violations by forbidding dummy cell placement in the first place.

For example, if Device A has a threshold voltage of 0.4 V, Device A may require that a neighboring device with threshold voltage greater than 0.6 V be at least 2 microns away. In the example, if Device B is adjacent to Device A and has a threshold voltage of 0.7 V, then Device A and Device B are placed at least 2 microns apart. Thus, the forbidden region around Device A for dummy cell placement is at least 2 microns on all sides of Device A.

In Step 306, a set of initial dummy cells is generated in accordance with one or more embodiments of the invention. Specifically, the regions from 300, 302, and 304 are compiled to determine regions for dummy cell placement. Locations for dummy cells in the determined regions are selected. Each dummy cell location that is selected corresponds to at least one dummy cell that is added to the set of initial dummy cells.

More specifically, in one or more embodiments of the invention, the regions selected in Steps 300 and 302 are merged to form a region available for dummy placement.

Then, the forbidden regions selected in Step 304 are removed from the region available for dummy placement. For example, half of the semiconductor wafer may be available for dummy cell placement. In the example, based on the selection of forbidden regions, a fourth of the semiconductor wafer may include forbidden regions. Thus, the final region available for dummy cell placement is narrowed to the fourth of the semiconductor wafer that is in the half, but not in the forbidden region.

In one or more embodiments of the invention, with the region for dummy cell placement determined, dummy cell locations are selected. Specifically, the physical placement of dummy cells in the region is determined based on the layout dependent effects described in Step 300 and device density inconsistencies described in Step 302. The locations for dummy cells are selected and added to the set of initial dummy cells. In one or more embodiments of the invention, based on the type of layout dependent effect, a dummy cell may be placed in between a device and a semiconductor area to reduce the effect of the layout dependent effect. For example, in order to reduce the oxide diffusion effect, a dummy cell may be placed between a device and the oxide diffusion area to equalize the spacing between the oxide area and neighboring devices. In the example, if Device A has a shorter oxide diffusion area spacing compared to Device B, then a dummy cell may be placed between Devices A and B to equalize the distance to the oxide diffusion area for both devices.

In one or more embodiments of the invention, the set of initial dummy cells is stored as a list of dummy cell identifiers. Specifically, the set of initial dummy cells is stored as a data structure such as a list, table, or database entries that includes dummy cell identifiers. In one or more embodiments of the invention, the dummy cell identifiers are stored with the corresponding location of the dummy cell in the data structure.

In Step 308, a dummy cell is selected from the set of initial dummy cells in accordance with one or more embodiments of the invention. In one or more embodiments of the invention, a dummy cell identifier may be randomly selected or selected according to a predetermined order from the set of initial dummy cells. In Step 310, the attributes of the selected dummy cell are configured based on location in accordance with one or more embodiments of the invention. Specifically, once dummy cell locations are determined, the attributes of surrounding devices are obtained and the dummy cells are configured with the same attributes. In one or more embodiments of the invention, the attributes of dummy cell, such as the length of regions in the dummy cell and type of device of the dummy cell, may be configured to match the attributes of surrounding devices. For example, if a dummy cell is surrounded by devices that are n-type transistors, the dummy cell may be configured to be an n-type transistor as well.

In Step 312, a determination is made whether remaining dummy cells to configure exist in accordance with one or more embodiments of the invention. If the determination is made that remaining dummy cells to configure exist, the process proceeds to Step 308. Otherwise, the process ends.

FIG. 4 shows a flowchart for selecting a set of legal dummy cells in accordance with one or more embodiments of the invention. In Step 400, the set of initial dummy cells is obtained from FIG. 3 in accordance with one or more embodiments of the invention. In one or more embodiments of the invention, a list of dummy cell identifiers of dummy cells in the set of initial dummy cells is obtained. In Step 402, a dummy cell is selected from the set of initial dummy cells to obtain a selected dummy cell in accordance with one or more embodiments of the invention. With the dummy cell locations selected, the dummy cells are further checked for illegal overlaps and device compatibility issues.

In Step 404, a determination is made whether a layer-to-layer illegal overlap of the selected dummy cell exists in accordance with one or more embodiments of the invention. Specifically, the dummy cell placement is evaluated for illegal overlaps by applying device overlap rules on devices in other hierarchies.

In one or more embodiments of the invention, a device overlap rule is a design rule that specifies the legal placement of a dummy cell overlapping with a device. By identifying devices in other hierarchies, the placement of a dummy cell is checked for physical overlap with other devices in other regions of the semiconductor wafer. A physical overlap occurs when at least a portion of one device is placed above or below at least a portion of another device. In one or more embodiments of the invention, a device overlap rule specifies that an illegal physical overlap occurs when the edges of two neighboring devices are not aligned. For example, if Device A is a dummy cell that is in Hierarchy A and Device B is in the neighboring Hierarchy B and the devices physically overlap, then the alignment of Device A and Device B may be checked to ensure that the device edges are aligned with one another.

If the determination is made that a layer-to-layer illegal overlap of the selected dummy cell exists, then the process proceeds to Step 412. Otherwise, the process proceeds to Step 406.

In Step 406, a determination is made whether an illegal spacing overlap of the selected dummy cell exists in accordance with one or more embodiments of the invention. Specifically, the dummy cell placement is evaluated for illegal overlaps similar or the same as performed in Step 404. Unlike Step 404, the device overlap rules are applied to devices in the same hierarchy. Said another way, the placement of a dummy cell is checked for physical overlaps with other devices in same region of the semiconductor wafer.

If the determination is made that an illegal spacing overlap of the selected dummy cell exists, then the process proceeds to Step 412. Otherwise, the process proceeds to Step 408.

In Step 408, a determination is made whether a device mismatch of the selected dummy cell exists in accordance with one or more embodiments of the invention. Specifically, the selected dummy cell is checked for violation of a device matching requirement for surrounding devices as described in Step 304. In contrast to Step 304, the device mismatch determination is made on a per-device basis instead of on a per-region basis.

If the determination is made that a device mismatch of the selected dummy cell exists, then the process proceeds to Step 412. Otherwise, the process proceeds to Step 410.

In Step 410, the selected matched dummy cell is added to the set of legal dummy cells in accordance with one or more embodiments of the invention. In Step 412, the selected mismatched dummy cell is removed from the set of initial dummy cells in accordance with one or more embodiments of the invention. Removing the selected mismatched dummy cell may be required when adding remaining dummy cells to the set of legal dummy cells, deleting the mismatched dummy cell from the set of initial matched dummy cells, or otherwise removing the selected mismatched dummy cell, such that the selected mismatched dummy cell is not in the set of legal dummy cells in accordance with one or more embodiments of the invention. In one or more embodiments of the invention, an illegal overlap is any geometry sharing that triggers an error alarm in the design rule enforcer. Some illegal overlaps exist because of direct violation of design rules, while other overlaps are prohibited because the overlaps cause product quality degradation.

In Step 414, a determination is made whether remaining dummy cells to configure exist in accordance with one or more embodiments of the invention. If remaining dummy cells to configure exist, then the process proceeds to Step 402. Otherwise, the process ends.

Figure 5A:
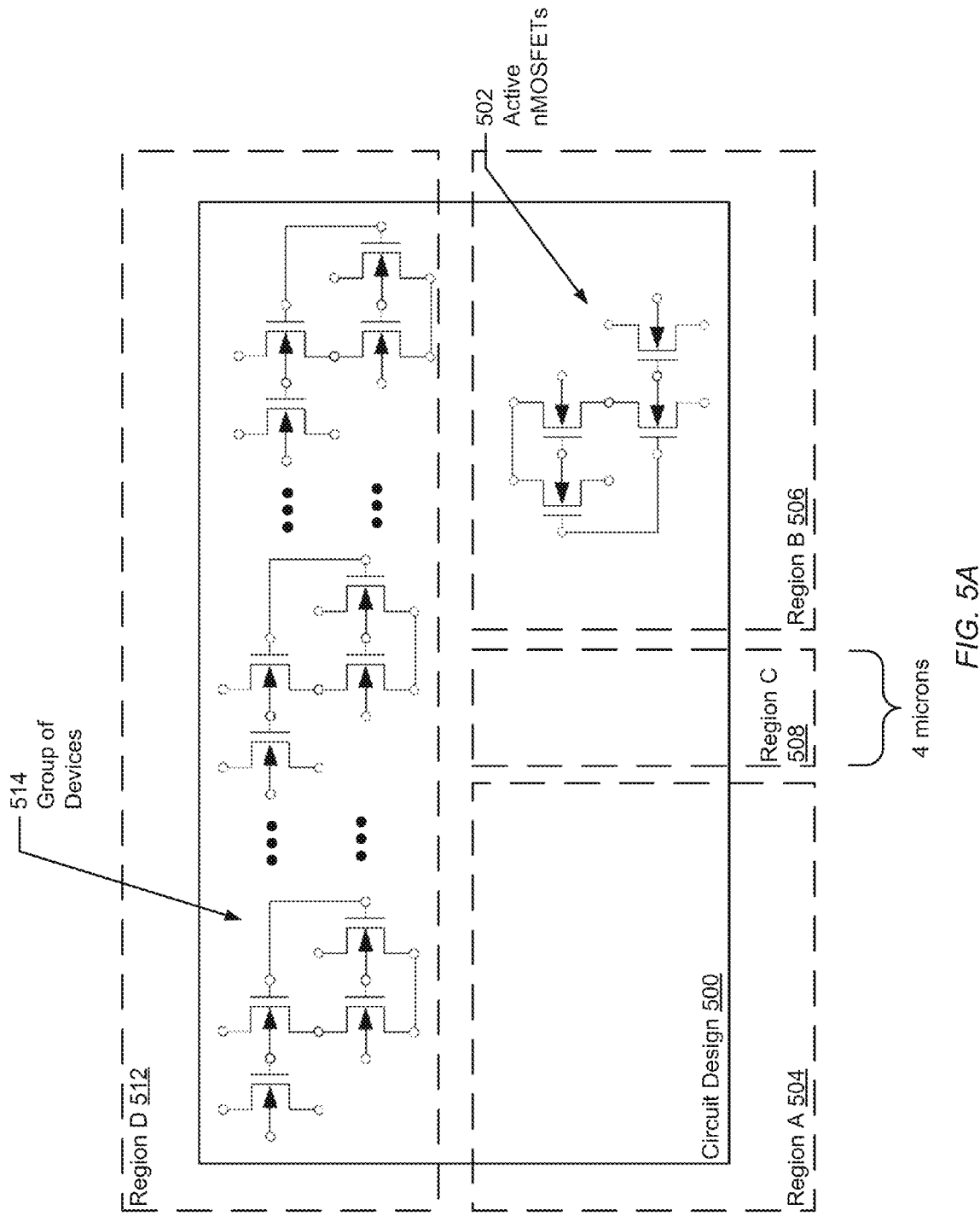
FIGS. 5A, 5B, 5C, 5D and 5E show an example in accordance with one or more embodiments of the invention.
Figure 5B:
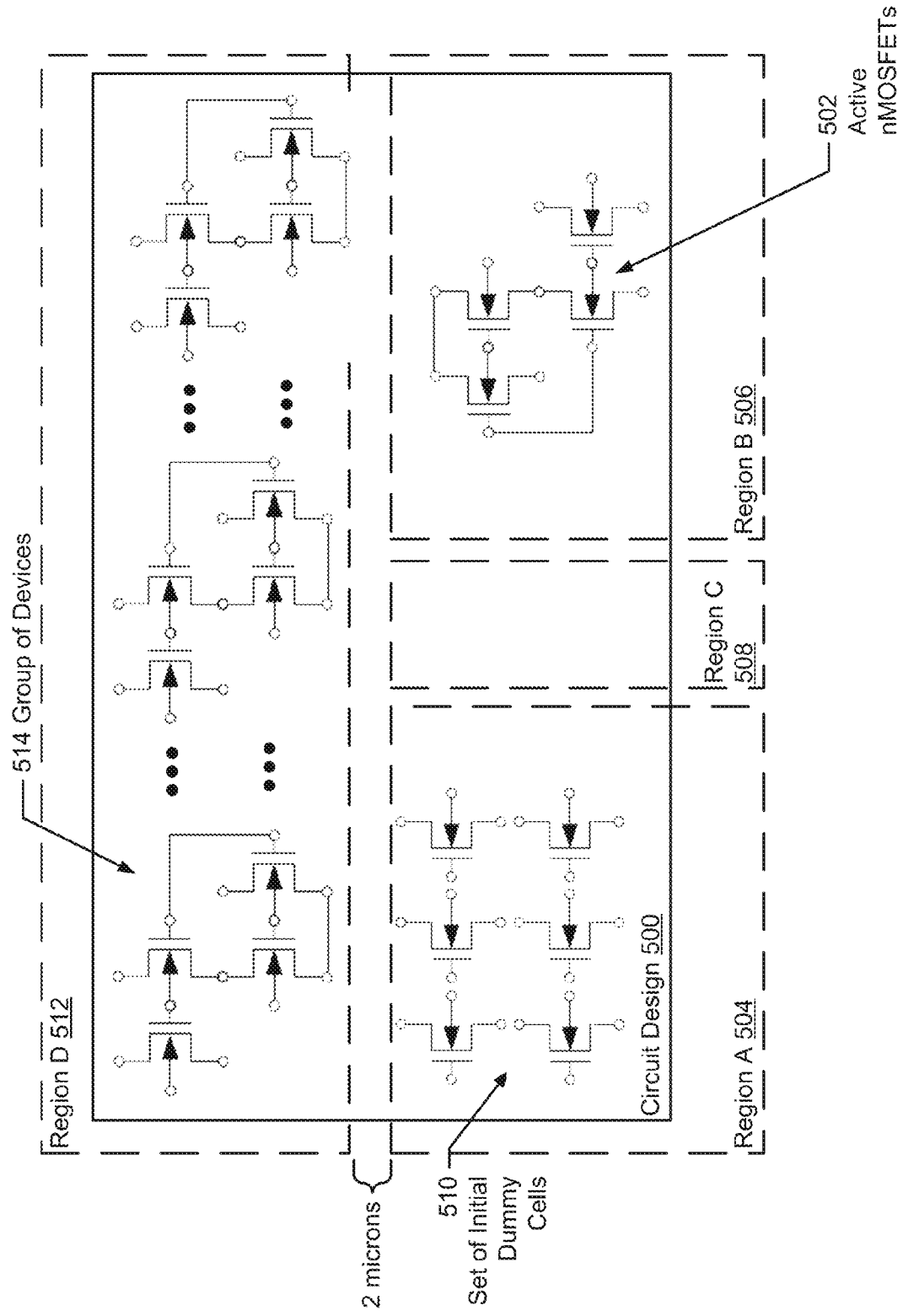
Figure 5C:
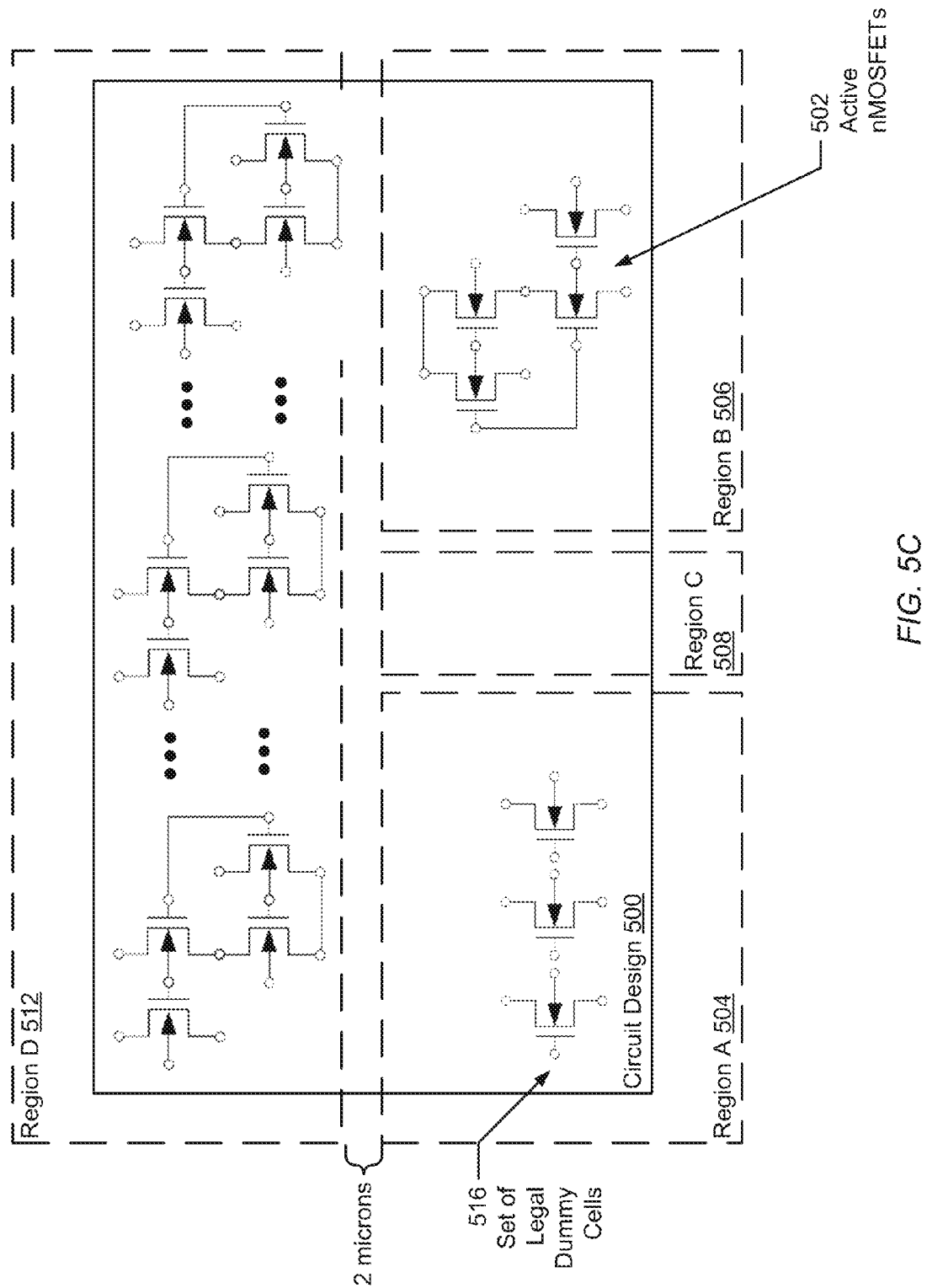

FIGS. 5A, 5B, and 5C show an example in accordance with one or more embodiments of the invention. The following example is for explanatory purposes only and is not intended to limit the scope of the invention. For the following example, consider the scenario in which a semiconductor wafer includes a circuit design that has been previously input by a user, Jeff.

Referring to FIG. 5A, the schematic of a circuit design (500) is shown. The circuit design (500) includes 4 active nMOSFETs (502). Jeff, using the GUI, selects to insert individual dummy cells that are not connected to any signals in a region of the circuit design as shown in FIG. 5A.

As shown in FIG. 5A, the area adjacent to the active nMOSFETs (502) is vacant as it does not include any devices. Given that Jeff selected to insert dummy cells, the dummy cell management system selects a region with density inconsistencies. In particular, region A (504) is selected as having a device density that is inconsistent with region B (506).

Similarly, regions with device compatibility issues are selected. In particular, region C (508) is selected as a region where dummy cells are forbidden to be placed. Based on the device matching requirements for the active nMOSFETs (502) supplied by the manufacturer, neighboring devices must be placed at least 4 microns away. Accordingly, a forbidden region, region C (508), is selected as the area that dummy cells cannot be placed.

Based on the region available for dummy cell placement (i.e., region A (504), the density of dummy cells to insert into region A (504) is calculated. In particular, region B (506) includes 4 nMOSFETs (502) in an area that is the same size as region A (504). Accordingly, the dummy cell management system creates 6 dummy cells to add to region A (504) to match, or substantially match, the density of device in region B (506).

Referring to FIG. 5B, the set of initial dummy cells (510) are shown in region A (504). Based on the attributes of the active nMOSFETs (502), the set of initial dummy cells (510) are configured to be nMOSFETs and are individual cells (i.e., not a dummy cell stack).

Within the set of initial dummy cells, the dummy management system checks for illegal overlaps and a device mismatch for each dummy cell. While checking for device mismatches in the set of initial dummy cells (504), the spacing between the dummy cells (510) and the group of devices (514) in region B is in violation of the device matching requirements of the group of devices (514) in region D. In particular, the device matching requirements for the group of devices (514) require a spacing of 3 microns from devices that have an operation threshold voltage that is at least 0.3 V lower than that of the group of devices (514). Because the group of devices has a threshold voltage of 0.7 V and dummy cells have a threshold voltage of 0.2 V, certain dummy cells are removed. In particular, three of the dummy cells are removed to create the set of legal dummy cells as shown in FIG. 5C.

Referring to FIG. 5C, the set of legal dummy cells (516) includes three dummy cells that are n-type. Accordingly, the set of legal dummy cells meets all design rules regarding illegal overlaps and device matching rules while eliminating the device density inconsistencies. As Jeff did not specify to add connections to the dummy cells, the dummy cells are left unconnected.

Figure 5D:
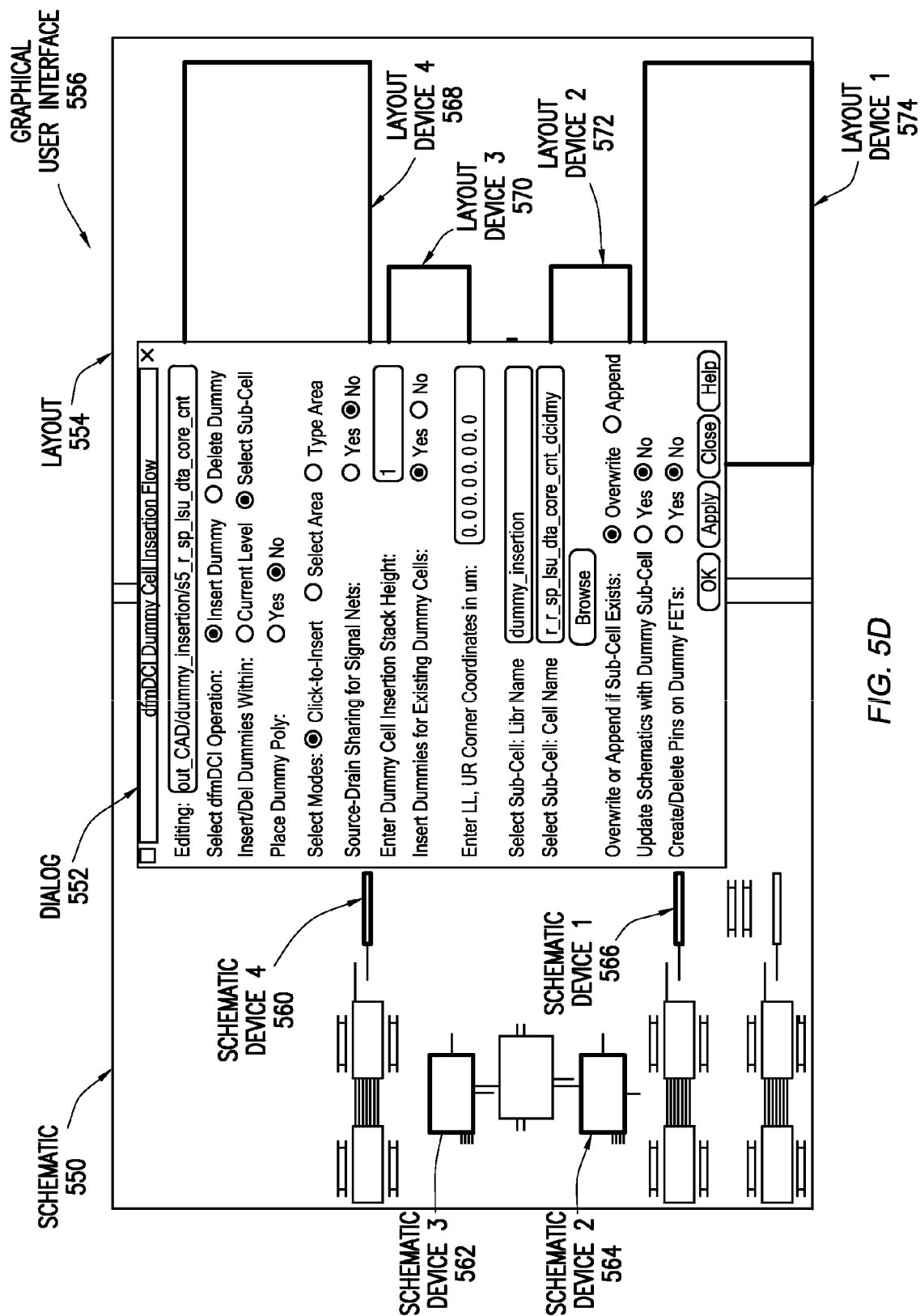
Figure 5E:
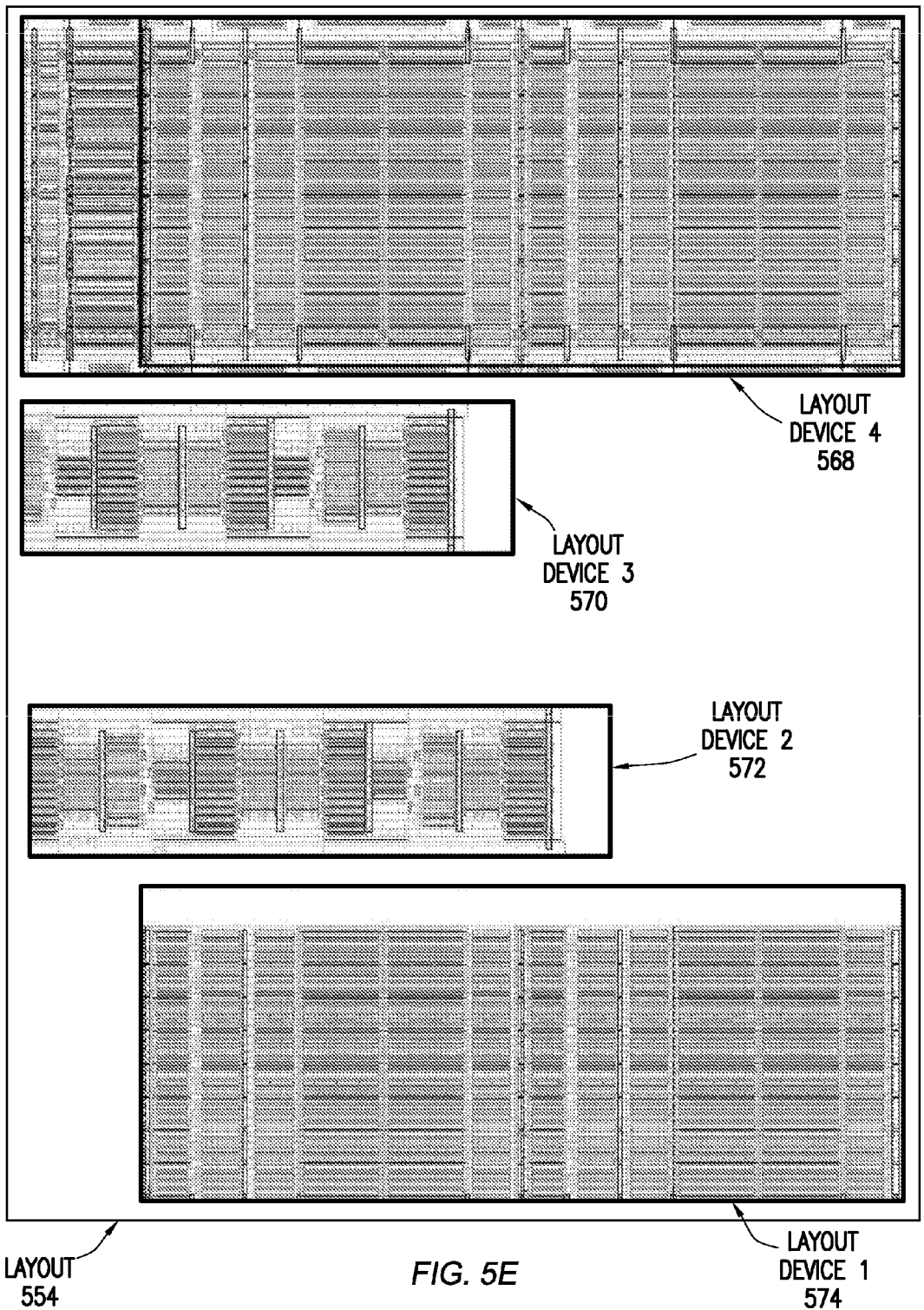

Referring to FIG. 5D, an example GUI (556) with a layout (554) and schematic (550) are shown. The schematic (550) shows the logical representation of devices and connections between devices. Further, the layout (554) shows the physical positioning of devices. As shown in FIG. 5D, a device is represented in both the schematic and layout. In particular, schematic device 1 (560) and layout device 1 (568) are the same device represented in each format, respectively. Similarly, schematic device 2 (562) is linked to layout device 2 (570), schematic device 3 (564) is linked to layout device 3 (572), and schematic device 4 (566) is linked to layout device 4 (574). FIG. 5E shows a more detailed diagram of the layout (554) shown in the example GUI (556) of FIG. 5D. Specifically, FIG. 5E shows the example GUI for layout device 1 (568), layout device 2 (570), layout device 3 (572), and layout device 4 (574). Returning to FIG. 5D, the dialog (552) provides Jeff with options regarding dummy cells. In particular, users may insert or delete dummy cells, select areas to operate on, and select the number of dummy cells to insert at a time.

Figure 6:
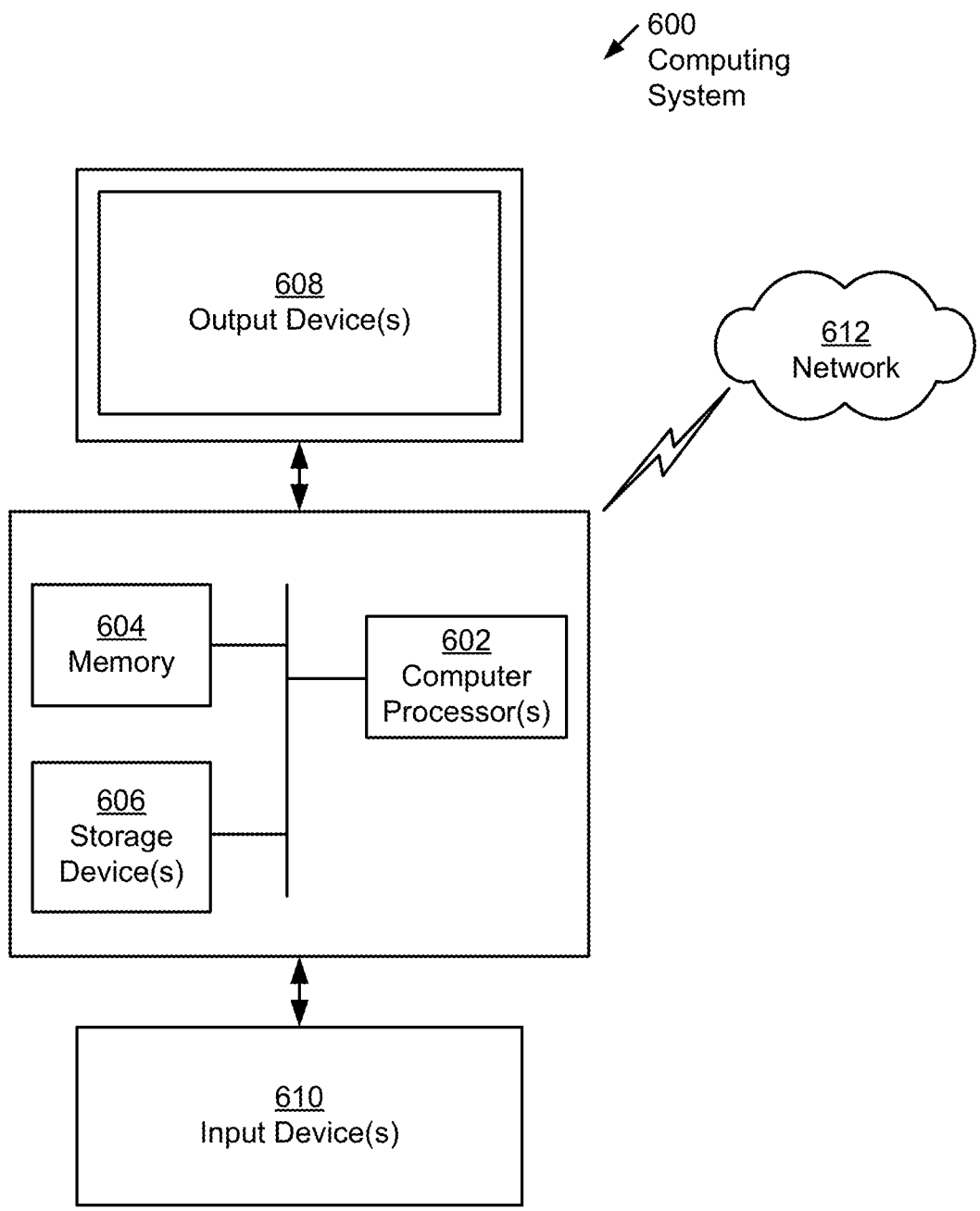
FIG. 6 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (614) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (614). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for manipulating a circuit design comprising:
receiving a plurality of dummy cell modification parameters;
selecting, by a computer processor and based on the plurality of dummy cell modification parameters, a dummy cell insertion region on the circuit design;
generating, in the dummy cell insertion region, a plurality of dummy cells;
selecting a first dummy cell from the plurality of dummy cells;
determining, by the computer processor and based on a location of the first dummy cell, an illegal overlap with the first dummy cell;
removing, by the computer processor in response to determining the illegal overlap and from the plurality of dummy cells, the first dummy cell;
inserting, by the computer processor, on the circuit design, and after removing the first dummy cell, the plurality of dummy cells to obtain a modified circuit design; and
presenting the modified circuit design to manufacture a semiconductor wafer, wherein device degradation is reduced during manufacturing of the semiconductor wafer.

2. The method of claim 1, further comprising:
configuring, based on the location of the first dummy cell in the dummy cell insertion region, the first dummy cell.

3. The method of claim 1, wherein selecting the dummy cell insertion region comprises:
selecting a region having a device performance degradation as the dummy cell insertion region.

4. The method of claim 1, wherein selecting the dummy cell insertion region comprises:
selecting a region having a density inconsistency as the dummy cell insertion region.

5. The method of claim 1, wherein selecting the dummy cell insertion region comprises:
selecting a region having a device compatibility inconsistency as the dummy cell insertion region.

6. The method of claim 1, wherein determining, based on a location of the first dummy cell, an illegal overlap with the first dummy cell comprises:
detecting a layer-to-layer illegal overlap between the first dummy cell and a device on the circuit design.

7. The method of claim 1, wherein determining, based on a location of the first dummy cell, an illegal overlap with the first dummy cell comprises:
detecting an illegal spacing overlap between the first dummy cell and a device on the circuit design.

8. The method of claim 1, further comprising:
determining, based on a location of the first dummy cell, a device mismatch between a device on the circuit design and a second dummy cell; and
removing, in response to determining the device mismatch and from the plurality of dummy cells, the second dummy cell,
wherein the plurality of dummy cells are inserted after removing the second dummy cell.

9. The method of claim 1, further comprising:
selecting a second dummy cell to remove based on a request to remove the second dummy cell in the dummy cell modification parameter;
removing the second dummy cell from the circuit design; and
removing each connection between the second dummy cell and a device on the circuit design.

10. The method of claim 1, wherein presenting the modified circuit design comprises:
displaying a schematic of the modified circuit design; and
displaying a layout of the modified circuit design.

11. A system for manipulating a circuit design comprising:
a data repository for storing the circuit design;
a computer processor;
a dummy cell manager executing on the computer processor for causing the computer processor to:
select, based on a plurality of dummy cell modification parameters, a dummy cell insertion region on the circuit design,
generate, in the dummy cell insertion region, a plurality of dummy cells;
select a first dummy cell from the plurality of dummy cells,
determine, based on a location of the first dummy cell, an illegal overlap with the first dummy cell,
remove, in response to determining the illegal overlap and from the plurality of dummy cells, the first dummy cell, and
insert, on the circuit design and after removing the first dummy cell, the plurality of dummy cells to obtain a modified circuit design; and
a graphical user interface executing on the computer processor for causing the computer processor to:
receive the plurality of dummy cell modification parameters, and
present the modified circuit design to manufacture a semiconductor wafer, wherein device degradation is reduced during manufacturing of the semiconductor wafer.

12. The system of claim 11, wherein the data repository is further configured to store a plurality of design rules and wherein the dummy cell manager comprises a design rule enforcer configured to enforce the plurality of design rules.

13. The system of claim 12, wherein enforcing the plurality of design rules comprises:
determining the illegal overlap based on at least one design rule of the plurality of design rules, and
removing the first dummy cell based on the illegal overlap.

14. The system of claim 11, wherein the dummy cell manager comprises:

a connectivity engine configured to:
  select a second dummy cell to remove based on a request to remove the second dummy cell in the dummy cell modification parameter;
  remove the second dummy cell from the circuit design; and
  remove each connection between the second dummy cell and a device on the circuit design.

15. The system of claim 11, wherein the graphical user interface is configured to present the modified circuit design by:
  displaying a schematic of the modified circuit design, and
  displaying a layout of the modified circuit design.

16. A non-transitory computer readable medium storing instructions for manipulating a circuit design, the instructions comprising functionality to:
  receive a plurality of dummy cell modification parameters;
  select, based on the plurality of dummy cell modification parameters, a dummy cell insertion region on the circuit design;
  generate, in the dummy cell insertion region, a plurality of dummy cells;
  select a first dummy cell from the plurality of dummy cells;
  determine, based on a location of the first dummy cell, an illegal overlap with the first dummy cell;
  remove, in response to determining the illegal overlap and from the plurality of dummy cells, the first dummy cell;
  insert, on the circuit design and after removing the first dummy cell, the plurality of dummy cells to obtain a modified circuit design; and
  present the modified circuit design to manufacture a semiconductor wafer, wherein device degradation is reduced during manufacturing of the semiconductor wafer.

17. The non-transitory computer readable medium of claim 16, wherein the instructions further comprise functionality to:
  configure, based on the location of the first dummy cell in the dummy cell insertion region, the first dummy cell.

18. The non-transitory computer readable medium of claim 16, wherein determining, based on a location of the first dummy cell, an illegal overlap with the first dummy cell comprises:
  detecting a layer-to-layer illegal overlap between the first dummy cell and a device on the circuit design.

19. The non-transitory computer readable medium of claim 16, wherein determining, based on a location of the first dummy cell, an illegal overlap with the first dummy cell comprises:
  detecting an illegal spacing overlap between the first dummy cell and a device on the circuit design.

20. The non-transitory computer readable medium of claim 16, wherein the instructions further comprise functionality to:
  determine, based on a location of the first dummy cell, a device mismatch between a device on the circuit design and a second dummy cell; and
  remove, in response to determining the device mismatch and from the plurality of dummy cells, the second dummy cell,
  wherein the plurality of dummy cells are inserted after removing the second dummy cell.

* * * * *